(12) United States Patent
Hwang et al.

(10) Patent No.: US 8,075,918 B2
(45) Date of Patent: *Dec. 13, 2011

(54) CARBON NANOCAPSULE THIN FILM AND PREPARATION METHOD THEREOF

(75) Inventors: Gan-Lin Hwang, Tainan (TW); Chao-Kang Chang, Taoyuan (TW); Shih-Jung Tsai, Hsinchu (TW); Tzy-Chin Day, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 1922 days.

This patent is subject to a terminal disclaimer.

(21) Appl. No.: 10/715,468

(22) Filed: Nov. 19, 2003

(65) Prior Publication Data

US 2005/0016863 A1 Jan. 27, 2005

(30) Foreign Application Priority Data

Jul. 22, 2003 (TW) ................ 92119917 A

(51) Int. Cl.
*A61K 9/14* (2006.01)
*C25D 9/00* (2006.01)
*C25D 3/56* (2006.01)
*B01J 19/08* (2006.01)
*B05B 5/025* (2006.01)
*C01B 31/08* (2006.01)

(52) U.S. Cl. ........ 424/489; 205/316; 205/238; 427/483; 427/457; 427/903; 423/448

(58) Field of Classification Search .................. 423/448; 427/903, 457, 483, 957; 205/316, 238; 424/489
See application file for complete search history.

(56) References Cited

U.S. PATENT DOCUMENTS

| | | | | |
|---|---|---|---|---|
| 5,277,996 A | * | 1/1994 | Marchetti et al. | 429/44 |
| 5,368,890 A | * | 11/1994 | de Nagybaczon | 427/249.8 |
| 5,547,748 A | * | 8/1996 | Ruoff et al. | 428/323 |
| 6,159,742 A | * | 12/2000 | Lieber et al. | 436/164 |
| 6,399,785 B1 | * | 6/2002 | Murphy et al. | 506/15 |
| 2001/0050219 A1 | * | 12/2001 | Anazawa et al. | 204/173 |
| 2002/0060514 A1 | * | 5/2002 | Nakamoto | 313/311 |
| 2002/0061397 A1 | * | 5/2002 | Iwamura et al. | 428/334 |
| 2002/0127171 A1 | * | 9/2002 | Smalley et al. | 423/447.6 |
| 2002/0141934 A1 | * | 10/2002 | Gogotsi et al. | 423/448 |
| 2002/0187403 A1 | * | 12/2002 | Hinokuma et al. | 429/306 |
| 2004/0126303 A1 | * | 7/2004 | Hwang | 423/447.2 |

* cited by examiner

*Primary Examiner* — Blessing Fubara
(74) *Attorney, Agent, or Firm* — Birch, Stewart, Kolasch & Birch, LLP

(57) ABSTRACT

A carbon nanocapsule thin film and the preparation method thereof. A plurality of carbon nanocapsules are electroplated on a substrate, and the carbon nanocapsule thin film is thereby formed. By electroplating purified carbon nanocapsules on the substrate, the carbon nanocapsule thin film, electric- and heat-conductive, chemical-resistive, and anti-oxidizing, is formed.

20 Claims, 4 Drawing Sheets

CARBON NANOCAPSULE THIN FILM AND PREPARATION METHOD THEREOF

This Nonprovisional application claims priority under 35 U.S.C. §119(a) on Patent Application No(s). 092119917 filed in TAIWAN on Jul. 22, 2003, the entire contents of which are hereby incorporated by reference.

BACKGROUND OF THE INVENTION

1. Field of the Invention

The present invention relates to carbon nanocapsules, and more particularly to a carbon nanocapsule thin film.

2. Description of the Related Art

A carbon nanocapsule is a polyhedral carbon cluster constituted by having concentric multi-layers of closed graphitic sheet structure. The diameter of a carbon nanocapsule is about 3-100 nm. There are two types of carbon nanocapsules: hollow and metal-filled. The center of a hollow carbon nanocapsule is leaving a nanoscale cavity, while that of a metal-filled nanocapsule is filled with metals, metal oxides, metal carbides, or alloys.

Carbon nanocapsules were first discovered with carbon nanotubes in 1991, in the process of producing carbon nanotubes. Owing to the strong van der Waals force between carbon nanocapsules and carbon nanotubes, it is not easy to isolate carbon nanocapsules from the carbon nanotubes. In addition, the amount of carbon nanocapsules produced with carbon nanotubes is sufficient only for structural observation under an electron microscope, thus the application thereof is limited.

With continuous research, processes producing high-purity hollow carbon nanocapsules as well as magnetic metal-filled carbon nanocapsules have been developed. (Please refer to U.S. patent application Ser. Nos. 10/255.669 and 10/329.333) In addition to the chemical properties of carbon, with the special hyperfullerene structure and optoelectronic properties of carbon nanocapsules, a carbon nanocapsule thin film is expected to be electric- and heat-conductive, anti-oxidizing, and as structurally stable as graphite; thus it is applicable for an electric- and heat-conductive film, a chemical-resistive and anti-oxidizing protective film, a carbon electrode of an ultra-thin lithium battery and others.

G. A. J. Amaratunga et al, in Hard Elastic Carbon Thin Films from Linking of Carbon Nanoparticle (Nature 383, 321 (1996)), arc-spray carbon nanotubes, hollow carbon nanocapsules and carbon particles on a substrate to form a high-strength mixing carbon film. However, arc-spray must be performed under a very high temperature, and the dispersion of carbon nanocapsules in the mixed carbon film is not uniform. In addition, it is difficult to control the content of carbon nanocapsules in the mixed carbon film.

SUMMARY OF THE INVENTION

Accordingly, an object of the present invention is to provide a carbon nanocapsule thin film and the preparation method thereof. By integrating the fore-mentioned manufacturing methods of purified carbon nanocapsules, the above disadvantages are overcome.

Therefore, the invention provides a carbon nanocapsule thin film, prepared by electroplating a plurality of carbon nanocapsules onto a substrate.

The invention further provides a carbon nanocapsule thin film preparation method, which comprises providing a substrate and electroplating a plurality of carbon nanocapsules onto the substrate.

DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
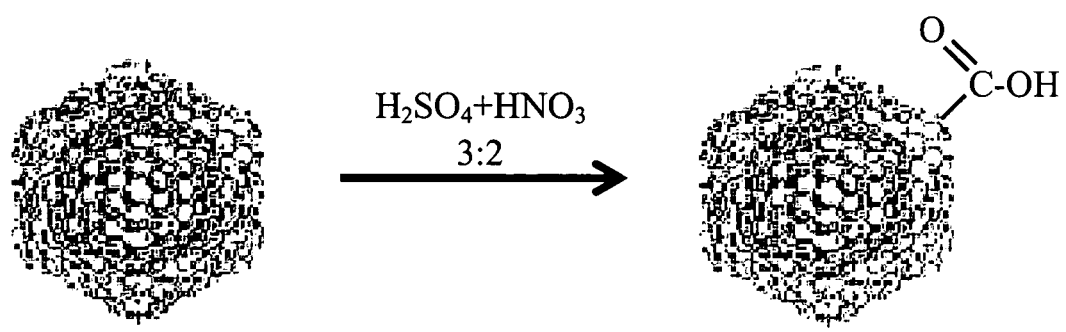
FIG. 1 illustrates the functionalization of a hollow carbon nanocapsule in the embodiment.

Before preparing a carbon nanocapsule thin film, high-purity carbon nanocapsules are functionalized such that they are able to disperse uniformly in the solution. Meanwhile, the functional groups added thereby are dissociated in the solution into a charged state, such that the positive- or negative-charged functionalized carbon nanocapsules can be uniformly electroplated onto a substrate. In addition, by controlling the content of the high-purity carbon nanocapsules in the electroplating solution, the content of the high-purity carbon nanocapsules in the carbon nanocapsule thin film can thereby be quantitatively determined. For example, a carbon nanocapsule thin film with a content of carbon nanocapsules above 99% can be prepared by electroplating carbon nanocapsules with purity above 99%. In addition, by controlling the mixed ratio of carbon nanocapsules and other components in the electroplating solution, e.g. metal ions, to be, for example, 60% carbon nanocapsules and 40% metal ions, a carbon nanocapsule thin film of similar content can be prepared.

Furthermore, preparing a carbon nanocapsule thin film by electroplating does not require a high-temperature manufacturing environment as arc-spray does, and a carbon nanocapsule thin film including functional groups can also be prepared. By modifying carbon nanocapsules with different functional groups, carbon nanocapsule thin films having various surface chemical properties, e.g. strong adhesion of the film to the substrate, can be prepared.

According to the invention, the carbon nanocapsule is a polyhedral carbon cluster constituted by having concentric multi-layers of closed graphitic sheet structure, and the diameter of a carbon nanocapsule is 3-100 nm.

According to the invention, the carbon nanocapsule is a hollow carbon nanocapsule or a metal-filled carbon nanocapsule filled with metals, metal oxides, metal carbides, or alloys.

The thickness of the carbon nanocapsule thin film is preferably 20 nm-1 mm. A redox agent or an external electric field can be applied as a driving force for electroplating. The potential of the external electric field is preferably 0.01V-6V. The redox agent is, for example, $LiAlH_4$, $NaBH_4$ or formaldehyde.

The carbon nanocapsules of the invention can further comprise a functional group, for example, a functional group that carries at least one positive charge after dissociation in the electroplating solution, such that the carbon nanocapsules with the functional group can be electroplated onto a negative electrode. The types of functional groups are, for example, amine or quaternary ammonium group. Furthermore, the carbon nanocapsules can further comprise a functional group that carries at least one negative charge after dissociation in the electroplating solution, such that the carbon nanocapsules with the functional group can be electroplated onto a positive electrode. The types of functional groups are, for example, carboxyl group, $SO_4^-$ or $PO_4^-$.

The content of carbon nanocapsules in the carbon nanocapsule thin film is, for example, 20-100 vol %, preferably 40-100 vol %, and more preferably 60-100 vol %. The content of carbon nanocapsules in the carbon nanocapsule thin film is controllable by adjusting electroplating parameters, e.g. the carbon nanocapsule concentration in the electroplating solution.

EMBODIMENT

As in FIG. 1, hollow carbon nanocapsules were first functionalized.

A reaction flask (1 L) was charged with hollow carbon nanocapsules (10 g) dissolved in 500 ml of sulfuric acid/nitric acid (molar ratio=3:2). The mixture was stirred by an ultrasonic cleaner for 10 minutes, and then heated to about 140° C. and refluxed for 2 hours. Afterwards, the mixture was centrifuged to separate the carbon nanocapsules from the strong acid, rinsing the carbon nanocapsules thoroughly followed by several centrifuges, until the pH value of carbon nanocapsules approached 7. The carbon nanocapsules obtained were black with —COOH groups bonded thereon. By titration using NaOH, the concentration of the —COOH groups was identified as 13 µmols/per gram carbon nanocapsules.

Figure 2:
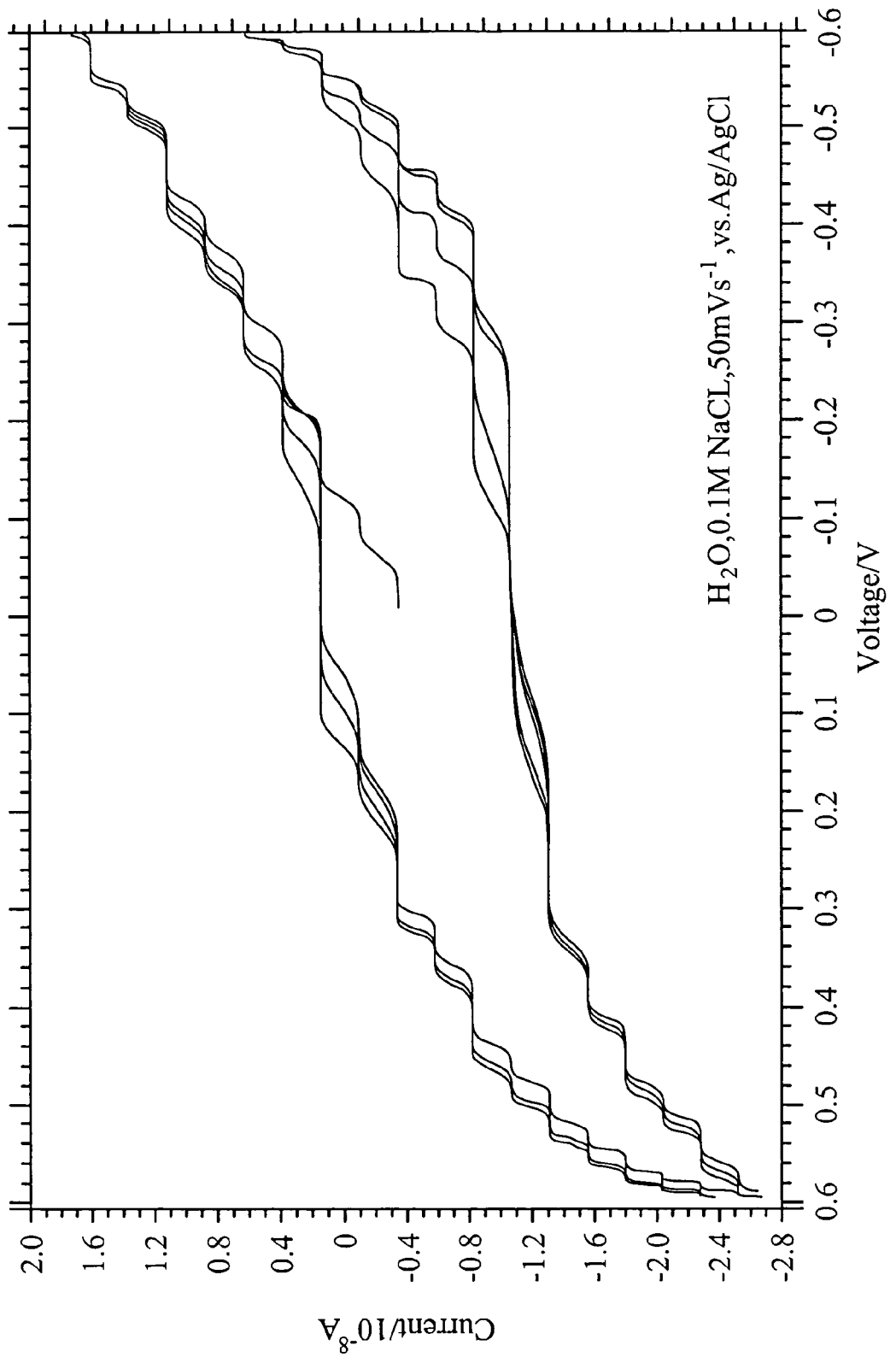
FIG. 2 shows the redox potentials of carbon nanocapsules tested by cyclic voltammetry (CV) in the embodiment.
Figure 3:
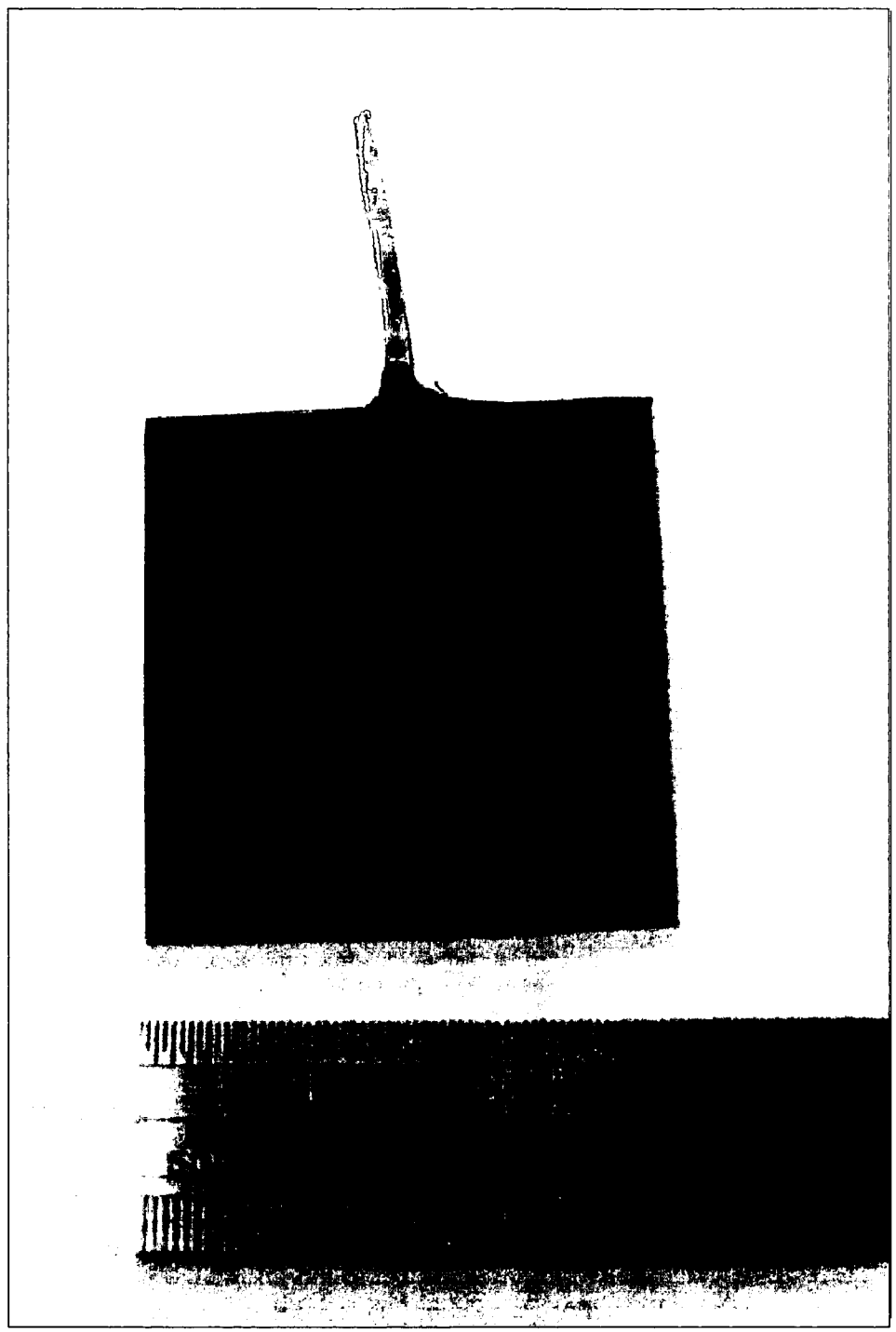
FIG. 3 shows the surface of the silver electrode after electroplating carbon nanocapsules in the embodiment.

A reaction flask (1 L) was charged with dried carboxyl group-functionalized carbon nanocapsules (0.1 g) and 100 ml $NaCl_{(aq)}$ (0.1M). The mixture was stirred by an ultrasonic cleaner for 10 minutes, and then tested by cyclic voltammetry to analyze the redox potentials of the carbon nanocapsules. The results, as shown in FIG. 2, indicated twelve oxidizing potentials and seven reducing potentials within −0.6V~+0.6V. Afterwards, the carboxyl group-functionalized carbon nanocapsules were dispersed (or dissolved) into the electroplating solution, a silver electrode with an area of 3 cm×3 cm was disposed as the anode, a platinum electrode as the cathode, and the black carbon nanocapsules were then electroplated onto the silver electrode, as shown in FIG. 3, using a current of 1 A and a voltage of 1.3V for 10 minutes.

Figure 4:
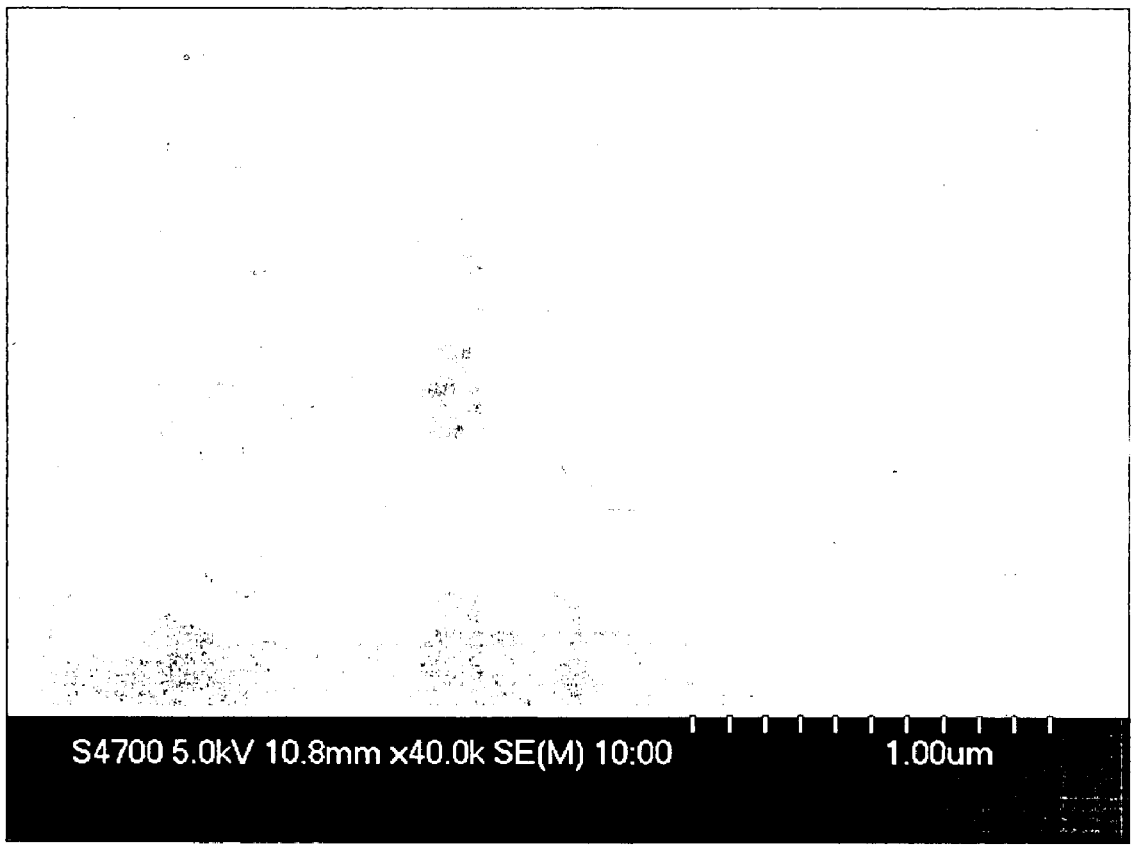
FIG. 4 shows the carbon nanocapsule thin film in the embodiment by SEM observation.

The carbon nanocapsule thin film on the silver electrode was then observed under a scanning electron microscope (SEM). The carbon nanocapsule thin film, as shown in FIG. 4, had a thickness of around 2 µm.

After placing in royal water for 1 minute, the carbon nanocapsule thin film showed no degradation under SEM, further proof that a good chemical resistivity is able to protect the metal thereunder.

As shown in the embodiment, the carbon nanocapsule thin film prepared by electroplating does not require a high-temperature manufacturing environment. Without considering the thermal-degradation temperature of the substrate, applicable substrates are expanded, and any conductive substrate is therefore applicable.

In addition, due to the good dispersion of functionalized carbon nanocapsules in the electroplating solution, a carbon nanocapsule thin film with uniformly-coat carbon nanocapsules is prepared. Furthermore, by controlling the content of the electroplating solution, the content of the carbon nanocapsule thin film is thereby quantitatively determined. As in the embodiment, the carbon nanocapsule thin film with a content of carbon nanocapsules above 95% was prepared by electroplating carbon nanocapsules with purity above 95%, and thus exhibited good electro- and heat conduction, chemical resistivity and anti-oxidizing properties.

The foregoing description has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A carbon nanocapsule thin film, prepared by electroplating a plurality of carbon nanocapsules onto a substrate, wherein the carbon nanocapsules comprise a functional group and the functional group carries at least one charge after dissociation,
   the carbon nanocapsule is a polyhedral carbon cluster constituted by having concentric multi-layers of closed graphitic sheet structure and the diameter of the carbon nanocapsule is about 3-100 nm,
   the substrate is an electrode for electroplating, and
   the functionalized carbon nanocapsules directly contact the substrate.

2. The carbon nanocapsule thin film as claimed in claim 1, wherein the carbon nanocapsule is hollow.

3. The carbon nanocapsule thin film as claimed in claim 1, wherein the carbon nanocapsule is a metal-filled carbon nanocapsule filled with metals, metal oxides, metal carbides, or alloys.

4. The carbon nanocapsule thin film as claimed in claim 1, wherein the thickness of the carbon nanocapsule thin film is 20 nm-1 mm.

5. The carbon nanocapsule thin film as claimed in claim 1, wherein a redox agent or an external electric field is applied to offer a driving force for electroplating.

6. The carbon nanocapsule thin film as claimed in claim 5, wherein the potential of the external electric field is 0.01V-6V.

7. The carbon nanocapsule thin film as claimed in claim 1, wherein the charge of the functional group is positive.

8. The carbon nanocapsule thin film as claimed in claim 7, wherein the functional group is amine or quaternary ammonium.

9. The carbon nanocapsule thin film as claimed in claim 1, wherein the charge of the functional group is negative.

10. The carbon nanocapsule thin film as claimed in claim 9, wherein the functional group is carboxyl group, $SO_4^-$ or $PO_4^-$.

11. A method for preparing a carbon nanocapsule thin film, comprising:
    providing a substrate, wherein the substrate is an electrode for electroplating; and
    electroplating a plurality of carbon nanocapsules onto the substrate,
    wherein the carbon nanocapsules comprise a functional group and the functional group carries at least one charge after dissociation,
    the carbon nanocapsule is a polyhedral carbon cluster constituting multiple graphite layers having a balls-within-a ball structure and the diameter of the carbon nanocapsule is 3-100 nm, and
    the functionalized carbon nanocapsules directly contact the substrate.

12. The method as claimed in claim 11, wherein the carbon nanocapsule is hollow.

13. The method as claimed in claim 11, wherein the carbon nanocapsule is a metal-filled carbon nanocapsule filled with metals, metal oxides, metal carbides, or alloys.

14. The method as claimed in claim 11, wherein the thickness of the carbon nanocapsule thin film is 20 nm-1 mm.

15. The method as claimed in claim 11, wherein a redox agent or an external electric field is applied to offer a driving force for electroplating.

16. The method as claimed in claim 15, wherein the potential of the external electric field is 0.01V-6V.

17. The method as claimed in claim 11, wherein the charge of the functional group is positive.

18. The method as claimed in claim 17, wherein the functional group is amine or quaternary ammonium group.

19. The method as claimed in claim 11, wherein the charge of the functional group is negative.

20. The method as claimed in claim 19, wherein the functional group is carboxyl group, $SO_4^-$ or $PO_4^-$.

* * * * *